United States Patent [19]

Kia

[11] Patent Number: 4,957,684
[45] Date of Patent: Sep. 18, 1990

[54] SOFT MOLDING METHOD

[75] Inventor: Hamid G. Kia, Utica, Mich.

[73] Assignee: General Motors Corporation, Detroit, Mich.

[21] Appl. No.: 267,359

[22] Filed: Nov. 4, 1988

[51] Int. Cl.$^5$ .................. B29C 45/16; B29C 43/20
[52] U.S. Cl. .................................. 264/257; 264/258
[58] Field of Search ............ 264/250, 255, 257, 258, 264/261

[56] References Cited

U.S. PATENT DOCUMENTS

| | | | |
|---|---|---|---|
| 3,663,341 | 5/1972 | Veneziale | 264/258 |
| 3,755,031 | 8/1973 | Hoffman | 264/257 |
| 4,123,488 | 10/1978 | Lawson | 264/257 |
| 4,201,823 | 5/1980 | Russell | 264/258 |
| 4,379,103 | 4/1983 | Doerfling | 264/261 |
| 4,517,323 | 5/1985 | Ferguson | 264/258 |
| 4,548,861 | 10/1985 | Barnes | 264/257 |
| 4,714,575 | 12/1987 | Preston | 264/257 |
| 4,891,176 | 1/1990 | Drysdale | 264/250 |

Primary Examiner—Jay H. Woo
Assistant Examiner—Jeremiah Durkin, II
Attorney, Agent, or Firm—R. W. Tung

[57] ABSTRACT

A method of producing glass fiber mat reinforced plastic panels having at least one smooth appearance surface in a set of two matched mold members having interior mold surfaces defining a mold cavity contained therein of which at least one interior surface is the mirror image of the appearance surface of the panel. The method includes the steps of placing at least one layer of glass fiber mat in a mold cavity, pouring a polymeric material into the cavity saturating the glass fiber mat, closing the two mold members together with at least one layer of a flexible sheeting material disposed over and adjacent to the interior mold surface opposing the interior mold surface producing the appearance surface of the panel, clamping the two mold members together, curing the polymeric material for a sufficient time into a hard plastic panel, and opening the matched mold members and demold a finished panel having at least one smooth appearance surface.

7 Claims, 2 Drawing Sheets

SOFT MOLDING METHOD

FIELD OF THE INVENTION

The present invention relates to a method of molding glass fiber-reinforced plastic panels and, more particularly, relates to a method of producing a glass fiber mat reinforced plastic panel without the fiber readout defect on the surface of the panel.

BACKGROUND OF THE INVENTION

Glass fiber reinforced plastics have been used widely in the automotive industry in recent years. These plastics include sheet molding compound, glass fiber reinforced reaction injection moldable materials and various other glass fiber reinforced plastics. The advantages of lightweight, high strength, rust proofing and relatively low cost make these materials ideal for many automotive exterior body panel applications.

Of these materials, the reinforced reaction injection moldable material (RRIM) is of particular interest to the automotive industry because it can be processed economically with relatively low cost tooling. RRIM materials filled with glass fiber mats have greatly improved stiffness and dimensional stability and therefore are especially suitable for many automotive exterior body panel applications. The processing of such glass fiber mat reinforced RRIM is relatively simple. The process involves placing a glass fiber mat in a mold cavity and injecting RIM material into the closed mold such that the RIM material is soaked through the glass fiber mat. A completed plastic part can be removed after it is cured in the mold.

A typical RIM material used in this process is a polyurethane based material produced from two components, an isocyanate and a polyol. The in-mold pressure of such a material system used in a RIM process is typically less than 50 psi. As a consequence, low cost tooling having low clamping force can be used for the process.

The dimensional stability of glass fiber mat reinforced RIM material is greatly improved over that of a RIM material reinforced with milled glass. As a matter of fact, the dimensional stability of glass fiber mat reinforced RIM is even superior to that of aluminum. This superior dimensional stability is achieved while other traditional benefits of RRIM, i.e., stiffness, strength, and ease to processing are maintained.

In the processing of glass fiber mat reinforced RIM materials, a new problem was discovered. This is generally called a fiber readout defect observed in the surface layer of a glass fiber mat reinforced RIM part. It is particularly serious problem when panels are used for exterior automotive body applications where aesthetic quality is of prime importance.

The fiber readout problem is caused largely by the presence of glass fiber in the surface layer of a plastic panel. When a panel is situated in a mold under compression, resin material located between the panel surface and a glass fiber in the surface layer of the panel is under higher pressure than that located not adjacent to a glass fiber. As a consequence, when the part is demolded, the cured material located adjacent to a glass fiber will expand more than the resin material not adjacent to a glass fiber. This results in the panel having a surface showing protruding contours of glass fibers which are located immediately below the surface of the panel, commonly known as the fiber readout phenomenon.

Numerous efforts have been made to correct the fiber readout defect observed in glass fiber mat reinforced plastic panels. These efforts include the inventor's previous U.S. Pat. No. 4,610,835 issued Sept. 9, 1986 and assigned to the assignee of this invention. In that application, the inventor has shown that the application of a top coating layer in a secondary molding process could conceal fiber readout if pressure was released before the end of the molding cycle. However, this process requires delicate process control which may not be feasible in a mass production process.

It is therefore an object of the present invention to provide a method of producing glass fiber mat reinforced RIM panels without the fiber readout defect which is readily adaptable to a mass production process.

It is another object of the present invention to provide a method of making glass fiber mat reinforced RIM panels without the fiber readout defect such that panels can be readily decorated to produce a predecorated surface for automotive exterior body panel applications.

It is yet another object of the present invention to provide a method of making glass fiber mat reinforced RIM panels without the fiber readout defect by incorporating an innovative feature in the molding apparatus such that no extra processing time is necessary to produce smooth panels.

It is a further object if the present invention to provide a method of making glass fiber mat reinforced RIM panels without the fiber readout defect by incorporating the use of at least one layer of a flexible sheeting material in the molding apparatus adjacent to the molded panel.

SUMMARY OF THE INVENTION

I have discovered that one of the factors that is responsible for the formation of fiber readout defect is uneven stress conditions in the surface layer of the panel in the areas of the resin materials adjacent to a fiber glass. I have, therefore, invented a novel technique in which at least one layer of a flexible sheeting material is used in the mold apparatus during the molding process situated immediately adjacent to the non-appearance surface of the molded panel.

In accordance with a preferred practice of my invention, a method of producing glass fiber mat reinforced plastic panels without the fiber readout defect can be carried out by the following operative steps.

First, a set of matched metal molds is prepared of which at least one of the two opposing interior mold surfaces is the appearance surface to be reproduced on a molded panel. This appearance surface is the mirror image of the finished surface on a molded panel. At least one layer of a flexible sheeting material is placed on the mold surface producing the non-appearance side of the panel surface. One or more layers of glass fiber mats are then placed in the mold. After closing the two halves of the mold together, a polymeric resin is injected into the mold cavity. A sufficient time is allowed for the resin to cure before the mold is opened. A glass fiber mat reinforced plastic panel having a smooth appearance surface is thus produced.

The flexible sheeting material serves the important function of relieving the stresses imposed on the glass fibers by the clamping pressure of the mold.

In an alternate embodiment of my invention, an additional layer or layers of glass fiber veils are placed on top of the glass fiber mats adjacent to the appearance surface of the molded panel to control the distance of the glass fibers from the appearance surface. This additional layer or layers of glass fiber veils further improves the smoothness of the appearance surface of the RIM panel such that a so-called "class A surface" in the automotive industry is obtained directly from the molding process. A "class A surface" generally means a surface that can be painted directly without any further finishing steps and used as an exterior surface of an automobile.

DESCRIPTION OF THE DRAWINGS

Other objects, features and advantages of the present invention will become apparent upon consideration of the specification and the appended drawings, in which.

DESCRIPTION OF THE PREFERRED AND ALTERNATE EMBODIMENT

My invention is a unique method which allows for the production of glass fiber mat reinforced plastic panels without the fiber readout defect. The technique involves the use of an additional layer of a flexible sheeting material in between the two interior mold surfaces adjacent to the mold surface which is non-appearance. A polyurethane RIM material is then injected into the mold either through a center gate or through a side gate after glass fiber mats are first placed in the mold cavity.

A more noticeable improvement is achieved when one or more layers of glass fiber veils are used on top of the glass fiber mats in the appearance surface of the RIM panel. This process is described in detail in the alternate embodiment of the present invention. I have discovered that this improvement by the use of glass fiber veils attribute largely to the fact that the glass fiber mats are kept further away from the appearance surface of the RIM panel.

Figure 1:
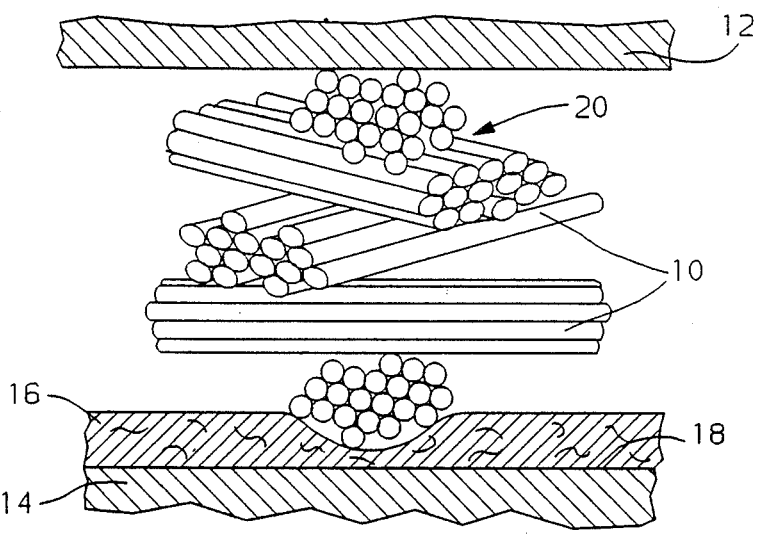
FIG. 1 is an enlarged cross-sectional view of a schematic representation of glass fibers contained in a glass fiber mat in between two mold surfaces and a layer of a glass veil.

Referring initially to FIG. 1, wherein enlarged cross-sectional view of a schematic representation of glass fibers 10 contained in between two mold members 12 and 14 and a layer of glass veil 16 is shown. This schematic is drawn for illustrative purpose and, therefore, the relative thickness of the various materials are not drawn to scale. It is to be noted that the use of the layer of glass veil 16 is optional and not necessary in the present invention.

The purpose of using layers of glass fiber veils is to control the distance of the glass fibers 10 contained in the glass fiber mats 20 from the appearance surface 18 of the RIM panel. The glass veil is composed of chopped glass fibers typically 1-10 cm long which are randomly oriented. Depending on the types of glass veils, the size of the filaments and the number of filaments per bundle varies. In the present invention, the glass veils used were the type having 1-5 filaments per bundle and the fibers are between 2-5 cm length. We have also used polyester veils to achieve the same purpose.

A fine texture glass veil I have used is commercially available from the International Paper Company (grade 80000110) which is composed of 75% 0.5 inch glass filaments and 25% 1 inch glass filaments. an equivalent material is a fine texture polyester veil commercially available from the Dexter Corporation (grade 9384).

The reinforcing glass fiber mats were supplied by the Owens-Corning Fiberglas Company (grade 8610) and PPG (AZDEL ® glass mats).

As shown in FIG. 1, the thickness of the glass veils were measured and enough layers were used to provide a 0.6 mm distance between the reinforcing glass fiber mat 20 and the appearance surface 18 of the RIM panel. However, in spite of the use of the glass veils, fiber readout still appears on the appearance surface of the panel. I have concluded that the reason is that the clamp pressure in a mold is transferred from one side of the cavity to the other through the glass fibers contained in the mats. Due to the nature of the glass fibers, there are regions of high stress which act as support pillars and primarily carry the clamping load across the cavity. These are the regions that show maximum fiber readout defect on the molded panel surface.

Figure 2:
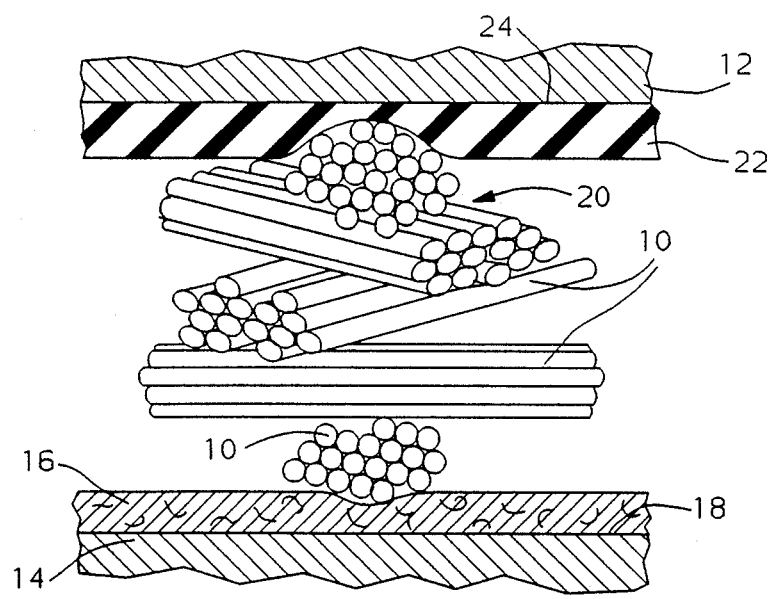
FIG. 2 is an enlarged cross-sectional view of a schematic representation of glass fibers contained in a glass fiber mat in between two mold surfaces, a layer of glass fiber veil, and a layer of a flexible sheeting material.

To minimize and eliminate this fiber readout defect, a thin layer of a flexible sheeting material is used on the non-appearance side of the RIM panel. This as shown in FIG. 2. A thin layer of a flexible sheeting material 22 is used on the non-appearance side of the RIM panel between the interior mold surface 24 and the glass fiber mats 20. As seen in FIG. 2, because of the flexible sheeting layer, the locally stressed fibers are now relaxed and, therefore, produce very little, if any, protrusions on the appearance surface of the RIM panel.

Figure 3:
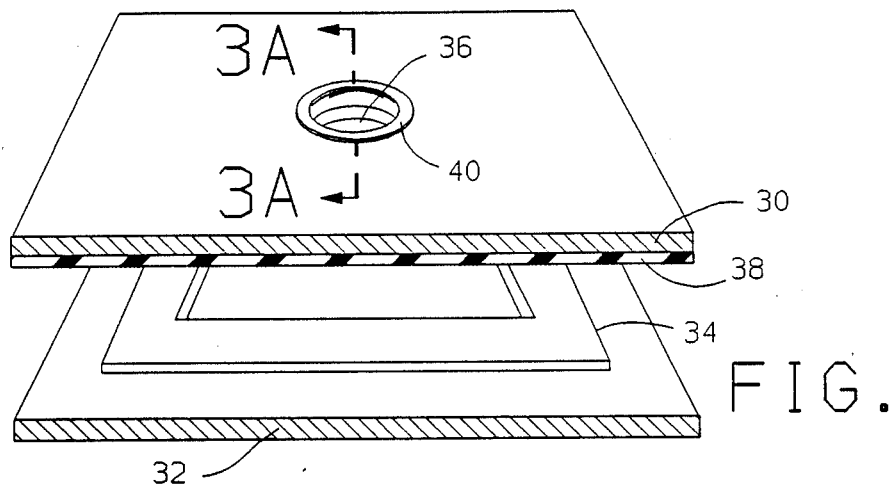
FIG. 3 is a schematic representation of a laboratory mold used in the present invention.
Figure 3A:
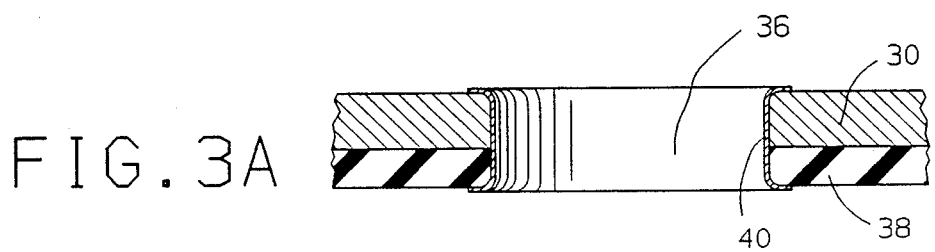
Figure 4:
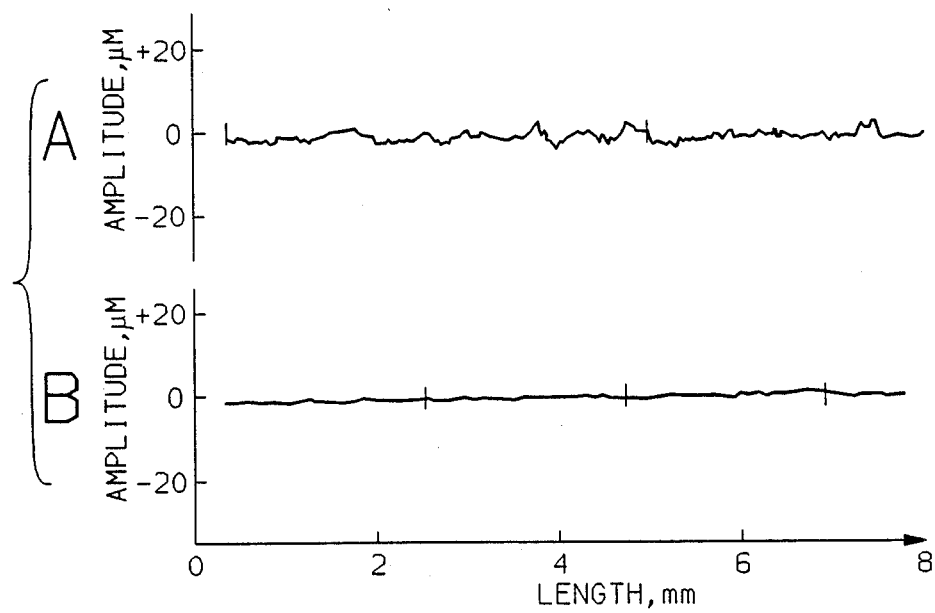
FIG. 4 shows profilometer readings from the surfaces of RIM panels reinforced with glass fiber mats; (a) molded without the flexible sheeting layer; (b) molded with the flexible sheeting layer.

To demonstrate my novel invention, a process of glass fiber mat reinforced reaction injection molding is used. This is shown in FIG. 3 and 3A. First, a mold is constructed using two metal plates 30 and 32 and a shim plate 34. The metal plates, serving as the upper mold member 30 and the lower mold member 32, have holes in the four corners (not shown) for the purpose of bolting the two plates together. A center injection port 36 is provided in the top plate 30 to allow the injection of polyurethane resin into the mold cavity formed by the shim plate 34. The center gating method is chosen here for convenience purpose to demonstrate my novel invention. I have also tried the method of using side gating which provides equally excellent results in producing smooth panels.

A layer of a flexible sheeting material 38 is placed onto the top plate 30 facing the shim plate 34 with the center injection port 36 aligned with the hole in the upper metal plate by the use of a flanged metal bushing 38. This is shown enlarged in FIG. 3A.

After one or more layers of glass fiber mats are placed inside the shim plate, the mold is closed with the bolts tightened at the four corners and placed in a press to be heated to 150° F. After the mold has reached the temperature, the press is opened and a polyurethane resin is injected into the hot mold through the center gate. The polyurethane resin is allowed to cure in the press for one minute and then the mold is opened and the part is demolded. The flexible sheeting layer remains in the mold and is used in the next molding operation. The part showed no fiber readout defect. In this laboratory demonstration, the molding pressure was applied by the tightening of the bolts and the press was used only to heat the mold and not to supply the pressure.

Alternatively, one or more layers of fine and coarse glass veils may be placed on top of the glass fiber mats adjacent to the appearance side of the RIM panel prior to the closing of the molds. RIM panels having further improved surface smoothness can be obtained by the use of these additional glass fiber veils.

The polyurethane resin I have used is a two-component system of a diphenylmethane diisocyanate and a polyether polyol. The isocyanate I used was supplied by Dow Chemical Company as ISONATE ® 181 having an equivalent weight of 183.3. The polyol I used was supplied by Union Carbide Company as NIAX ® 1134 having an equivalent weight of 1516.2. I have also added a chain extender, ethylene glycol supplied by Fisher Scientific as Grade AR and a catalyst of alkltin mercaptide commercially available as FORMREZ ® UL-29 from Witco Company to improve the processing characteristics of my polyurethane resin system.

A sample formulation of my polyurethane resin system is shown in Table 1.

TABLE 1

Formulation for the Polyurethane Resin

| COMPONENT | WEIGHT PERCENT |
| --- | --- |
| Isocyanate (diphenylmethane diisocyanate) | 65.0 |
| Polyol (polyether tetrol) | 25.0 |
| Chain Extender (ethylene glycol) | 10.0 |
| Catalyst (Formez UL-29) | 0.01 |

The flexible sheeting materials I have used are closed cell foam rubber materials of epichlorohydrin and Neoprene. The physical properties of a sample Neoprene material I have used is shown in Table 2. I have found that a thickness of the flexible sheeting material over 0.01 inch is best suitable for my novel process.

TABLE 2

Properties of the Flexible Sheeting Material

| Name: | Neoprene (G-207-N) by RUBATEX Co. |
| --- | --- |
| Durometer Hardness (Shore scale "00"): | 35 |
| Physical State: | An expanded closed cell polymer |
| Density: | 20 lb/ft$^3$ |
| Tensile Strength: | 150 psi |
| Compression Deflection: | 9 psi |
| Thickness: | 0.0625 inch |

By experimenting with many different types of flexible sheeting materials, I have discovered that a wide variety of materials may be used in my novel invention to produce equally satisfactory results. These materials include foam rubber, plastic foams, and felt materials. I have found that better results were obtained when the durometer readings of the materials are no longer than 60 on ASTM E-2240 Shore "A" scale and the compression deflection in the range of 1 to 50 psi as determined by ASTM D-1056.

Instead of injection molding through a center gate of urethane material, I have also demonstrated my process by a method similar to a hand-lay-up method. A gel coat is first prepared by using the resin formulation shown in Table 1, filled with 30 weight percent of calcium carbonate. A thickness of about 0.5 mm of this gel coat is then applied on the lower plate of the mold which has a smooth surface. This gel coat is allowed to partially cure at 150° F. for 5 minutes. To simulate a hand-lay-up process, four plies of glass fiber mats are then wetted and hand-laid on top of the gel coat. The upper mold plate with the flexible sheet layer is then placed on the glass fiber mats and pressed by hand to squeeze out the excess resin. The mold assembly is then placed in a press heated to 150° F. for 5 minutes to achieve the final cure. After curing, a RIM panel with a smooth surface is demolded which showed no fiber readout defect.

It is to be noted that while I have demonstrated the use of polyurethane in my embodiments above, I have tried other polymeric materials that have worked equally well in my novel invention. For instance, I have used a poly-isocyanurate supplied by Dow Chemical Company as SPECTRUM ® MM373, a polycarbonate also supplied by Dow Chemical Co. as SPECTRUM ® MM310, and a styrene based interpenetrating network type polymer supplied by Ashland Company as AROPOL ® 50437. All three materials when used in my novel invention have produced plastic panels with smooth appearance surfaces. I have reason to believe that any type of polymeric materials that can be suitably used in a reaction injection molding type of process can be used successfully in my invention.

While my invention has been demonstrated in a preferred embodiment and an alternative embodiment, without and with the use of additional glass veil layers, it is to be appreciated that someone skilled in the art may readily adopt these teachings to other variations of the technique utilizing the same principle.

I claim:

1. In a method of compression molding glass fiber mat reinforced plastic panels having at least one appearance surface in a set of two matched mold member of which at least one member having an interior mold surface being the mirror image of the appearance surface of said panel, of the type wherein at least one glass fiber mat is first placed in the mold cavity defined by the interior mold surfaces of said mold members and a polymeric material is introduced into the cavity saturating said mat and curing into a panel under heat and pressure transmitted through said mold members clamped together, the improvement comprising placing at least one layer of a reusable flexible sheeting material immediately adjacent to the interior mold surface opposing the mold surface produces the appearance surface of said molded panel prior to clamping the two mold members together and applying pressure on said mold members whereby said at least one layer of flexible sheeting material acts as a stress relief layer to prevent the formation of fiber readout defects and remains in said mold members after the compression molding process.

2. A method of producing glass fiber mat reinforced plastic panels having at least one smooth appearance surface in a set of two matched mold members having interior mold surfaces defining a mold cavity contained therein of which at least one said interior surface being the mirror image of the appearance surface of said panel, said matched mold members being equipped with an injection port for the injection of a polymeric material into said mold cavity, said method comprising:

placing at least one layer of glass fiber mat in said mold cavity, closing said two mold members together with at least one layer of a reusable flexible sheeting material disposed over and adjacent to the interior mold surface opposing said interior mold surface producing the appearance surface of said panel, clamping said two mold members together under sufficient clamping pressure such that no leaking of the polymeric materials occurs when injected into said mold cavity, injecting a sufficient amount of a polymeric material into said mold cavity through said injection port in said mold, curing said polymeric material for a sufficient time into a hard plastic panel, and opening said matched mold members and demold a finished panel having at least one smooth appearance surface whereby said at least one layer of flexible sheeting material acts as a stress relief layer to prevent the formation of fiber readout defects and remains in said mold members after the molding process.

3. A method of producing glass fiber mat reinforced plastic panels having at least one smooth appearance surface in a set of two matched mold members having interior mold surfaces defining a mold cavity contained therein of which at least one said interior surface being the mirror image of the appearance surface of said panel, said matched mold members being equipped with an injection port for the injection of a polymeric material into said mold cavity, said method comprising:

placing at least one layer of glass fiber mat in said mold cavity, closing said two mold members together with a layer of reusable flexible sheeting material having a thickness of no less than 0.01 inch disposed over and adjacent to the interior mold surface opposing said interior mold surface producing the appearance surface of said panel, clamping said two mold members together under sufficient clamping pressure that no leaking of the polymeric materials occurs when injected into said mold cavity, injecting a sufficient amount of a polymeric material into said mold cavity through said injection port in said mold, curing said polymeric material for a sufficient time into a hard plastic panel, and opening said matched mold members and demold a finished panel having at least one smooth appearance surface whereby said layer of flexible sheeting material acts as a stress relief layer to prevent the formation of fiber readout defects and remains in said mold members after the molding process.

4. A method of producing glass fiber mat reinforced plastic panels having at least one smooth appearance surface in a set of two matched mold members having interior mold surfaces defining a mold cavity contained therein of which at least one said interior surface being the mirror image of the appearance surface of said panel, said matched mold members being equipped with an injection port for the injection of a polymeric material into said mold cavity, said method comprising:

placing at least one layer of glass fiber mat in said mold cavity, closing said two mold members together with at least one layer of a reusable flexible sheeting material having a Shore "A" durometer of no larger than 60 as determined by ASTM D-2240 over and adjacent to the interior mold surface opposing said interior mold surface producing the appearance surface of said panel, clamping said two mold members together under sufficient clamping pressure such that no leaking of the polymeric materials occurs when injected into said mold cavity, injecting a sufficient amount of a polymeric material into said mold cavity through said injection port in said mold, curing said polymeric material for a sufficient time into a hard plastic panel, and opening said matched mold member and demold a finished panel having at least one smooth appearance surface whereby said at least one layer of flexible sheeting material acts as a stress relief layer to prevent the formation of fiber readout defects and remains in said mold members after the molding process.

5. A method of producing glass fiber mat reinforced plastic panels having at least one smooth appearance surface in a set of two matched mold members having interior mold surfaces defining a mold cavity contained therein of which at least one said interior surface being the mirror image of the appearance surface of said panel, said method comprising: placing at least one layer of glass fiber mat in said mold cavity, pouring a polymeric material into said cavity saturating said glass fiber mat, closing said two mole member together with at least one layer of a reusable flexible sheeting material disposed over and adjacent to the interior mold surface opposing said interior mold surface producing the appearance surface of said panel, clamping said two mold members together, curing said polymeric material for a sufficient time into a hard plastic panel, and opening said matched mold members and demold a finished panel having at least one smooth appearance surface whereby said at least one layer of flexible sheeting material acts as a stress relief layer to prevent the formation of fiber readout defects and remains in said mold members after the molding process.

6. A method of producing glass fiber mat reinforced plastic panels having at least one smooth appearance surface in a set of two matched mold members having interior mold surfaces defining a mold cavity contained therein of which at least one said interior surface being the mirror image of the appearance surface of said panel, said method comprising:

placing at least one layer of glass fiber mat in said mold cavity, pouring a polymeric material into said cavity saturating said glass fiber mat, closing said two mold members together with a layer of reusable flexible sheeting material having a thickness of no less than 0.01 inch disposed over and adjacent to the interior mold surface opposing said interior mold surface producing the appearance surface of said panel, clamping said two mold members together, curing said polymeric material for a sufficient time into a hard plastic panel, and opening said matched mold members and demold a finished panel having at least one smooth appearance surface whereby said layer of flexible sheeting material acts as a stress relief layer to prevent the formation of fiber readout defects and remains in said mold members after the molding process.

7. A method of producing glass fiber mat reinforced plastic panels having at least one smooth appearance surface in a set of two matched mold members having interior mold surfaces defining a mold cavity contained therein of which at least one said interior surface being the mirror image of the appearance surface of said panel, said method comprising:

placing at least one layer of glass fiber mat in said mold cavity, pouring a polymeric material into said cavity saturating said glass fiber mat, closing said two mold members together with at least one layer of a reusable flexible sheeting material having a Shore A durometer of no greater than 60 as determined by ASTM D-2240 disposed over and adjacent to the interior mold surface opposing said interior mold surface producing the appearance surface of said panel, clamping said two mold members together, curing said polymeric material for a sufficient time into a hard plastic panel, and opening said matched mold members and demold a finished panel having at least one smooth appearance surface whereby said at least one layer of flexible sheeting material acts as a stress relief layer to prevent the formation of fiber readout defects and remains in said mold members after the molding process.

* * * * *